United States Patent [19]

Beaussant

[11] Patent Number: 4,577,375

[45] Date of Patent: Mar. 25, 1986

[54] QUICK ATTACHMENT DEVICE FOR HARNESS OF A PIECE OF EQUIPMENT

[75] Inventor: Raymond Beaussant, Bretigny, France

[73] Assignee: Intertechnique, Plaisir, France

[21] Appl. No.: 645,779

[22] Filed: Aug. 30, 1984

[30] Foreign Application Priority Data

Aug. 31, 1983 [FR] France ................... 83 13974

[51] Int. Cl.⁴ ..................... A41F 1/00; A44B 11/25
[52] U.S. Cl. ........................ 24/580; 24/582; 24/583; 24/585; 128/201.23
[58] Field of Search ............. 24/580, 581, 582, 583, 24/584, 585, 171, 194; 128/201.23; 2/421, 321

[56] References Cited

U.S. PATENT DOCUMENTS

| | | | |
|---|---|---|---|
| 318,369 | 5/1885 | Gottstein | 24/584 |
| 794,098 | 7/1905 | Hainsfurther | 24/581 |
| 809,465 | 1/1906 | Roy et al. | 24/585 |
| 987,469 | 3/1911 | Lewis | 24/583 |
| 1,003,907 | 9/1911 | Hoffman | 24/582 |
| 1,663,621 | 3/1928 | Bowman | 24/585 |
| 2,208,026 | 7/1940 | Goldenberg | 24/580 |
| 2,867,812 | 1/1959 | Roth et al. | 24/585 |
| 3,035,573 | 5/1962 | Morton, Jr. et al. | 128/201.23 |
| 3,113,362 | 12/1963 | Petruzziello | 24/585 |

FOREIGN PATENT DOCUMENTS

| | | | |
|---|---|---|---|
| 570923 | 12/1957 | Italy | 24/581 |
| 286603 | 2/1953 | Switzerland | 24/585 |
| 331923 | 9/1958 | Switzerland | 24/585 |

Primary Examiner—Victor N. Sakran
Attorney, Agent, or Firm—Larson and Taylor

[57] ABSTRACT

The quick attachment device for the harness of a piece of equipment, which can be used to attach an oxygen mask to an aviator's helmet, comprises a receiver member adapted to receive a bayonet member securely connected to the harness. The bayonet member cooperates with the receiver member via locking means which can be retracted by pulling on a control plate which is carried by the bayonet member and can slide thereon. The bayonet member is formed by a solid blade bearing a rack engaging with retractable locking fingers provided on the receiver member and the control plate comprises notches which have the same pitch as those of the rack, and whose profile is such that they displace the resilient fingers out of the rack when the control plate is pulled, in the direction corresponding to the withdrawal of the bayonet member, from the abutment position into which it is resiliently urged.

9 Claims, 4 Drawing Figures

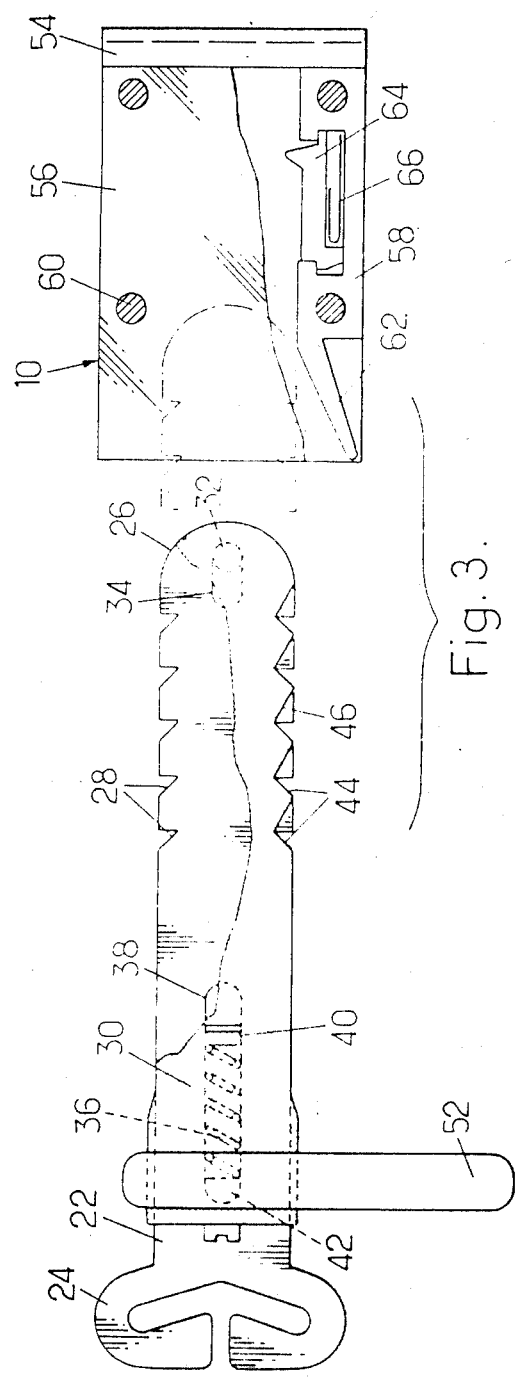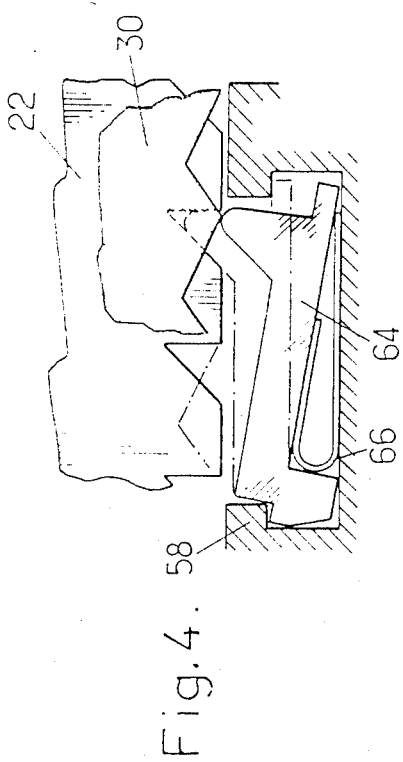
Fig. 3.
Fig. 4.

QUICK ATTACHMENT DEVICE FOR HARNESS OF A PIECE OF EQUIPMENT

BACKGROUND AND SUMMARY OF THE INVENTION

The invention relates to quick attachment devices adapted to ensure that a piece of equipment is reliably and accurately retained on a person wearing it, while enabling such person to lock and unlock the device easily. It finds a particularly important application in the field of attaching respiratory masks used by crew during high altitude flights.

In this application the mask must remain in place even under exceptional circumstances, (for example, high speed ejection), and moreover the device must not be knocked out of shape as a result of handling or impacts causing jamming or breakage. In addition the device must be easy to unlock, even with one hand, possibly wearing a glove.

Quick attachment devices intended to meet this demand are known of the type comprising a receiver member attached to the helmet and a bayonet member borne by a mask strap and cooperating via locking means which can be retracted by pulling on a control plate borne by the bayonet-member and being able to slide thereon from an abutment position into which it is resiliently urged.

In such prior art devices, a representative example of which is given in U.S. Pat. No. 3,035,573, the locking means comprise in the receiver member a rack enabling the position of the mask to be adjusted, the bayonet member having movable locking fingers which are biased by springs into a position of engagement with the rack, and can be retracted by operating the control plate.

The method, which at first glance seems attractive, since it makes the fixed member carry the position-adjusting means and therefore simplifies the design of the control plate, has in fact appreciable disadvantages. Since the moveable piece comprises three elements disposed side by side, the control plate, the locking fingers and the bayonet member, the latter must be formed by a thin blade to avoid making the assembly too thick. There is a risk that the thin blade may get twisted or even broken by forces exerted accidentally.

It is an object of the invention to supply a rapid attachment device which satisfies practical demands more satisfactorily than the prior art devices, more particularly in that it is of reduced weight, occupies only a small amount of space, and at the same time has increased resistance to the bayonet member being torn off.

To this end the invention provides more particularly a device of the type hereinbefore defined whose bayonet member is formed by a solid blade provided with a rack engaging with retractable locking fingers borne by the receiver member, and the control plate comprises notches which have the same pitch as those of the rack and whose profile is such that they displace the resilient fingers out of the rack when the control plate is pulled, in the direction corresponding to the withdrawal of the bayonet member, from the abutment position into which it is resiliently urged.

The invention will be more clearly understood from the following description of a non-limitative exemplary embodiment thereof.

SHORT DESCRIPTION OF THE DRAWINGS

FIG. 3 is a side elevation of the device shown in FIG. 2, portions being removed to shown the shape of the components more clearly; and FIG. 4 is a side elevation, to an enlarged scale, of a fraction of the device showing the way in which the locking fingers are driven out of the notches of the rack by the notches of the locking member.

DETAILED DESCRIPTION OF A PARTICULAR EMBODIMENT

In the application of the member which will be considered here, the attaching device 10 is intended for a harness for an oxygen mask 12 which is to be retained rightly against the pilot's face. In the embodiment illustrated the harness comprises a strap 14 the two ends of which have a device 10 for rapid attachment to the mask. The harness can be completed by a chinpiece 16 which also has a quick attachment device (not shown) similar to the first.

Figure 1:
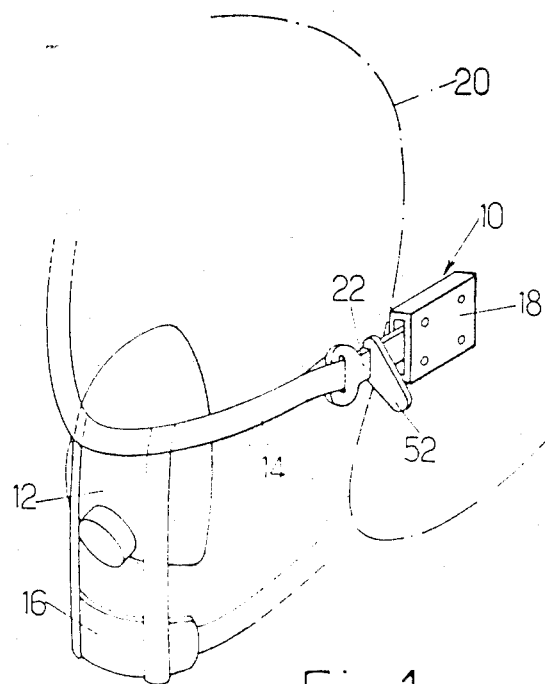
FIG. 1 is a schematic diagram showing the mounting of the device on harness for positioning a respiratory mask.

The device 10 comprises a receiver member 18 which is attached to the helmet 20 and whose outline is shown in chain dotted lines in FIG. 1, and a moveable part, formed by a bayonet member 22 attached to the strap 14 and associated control elements.

Figure 2:
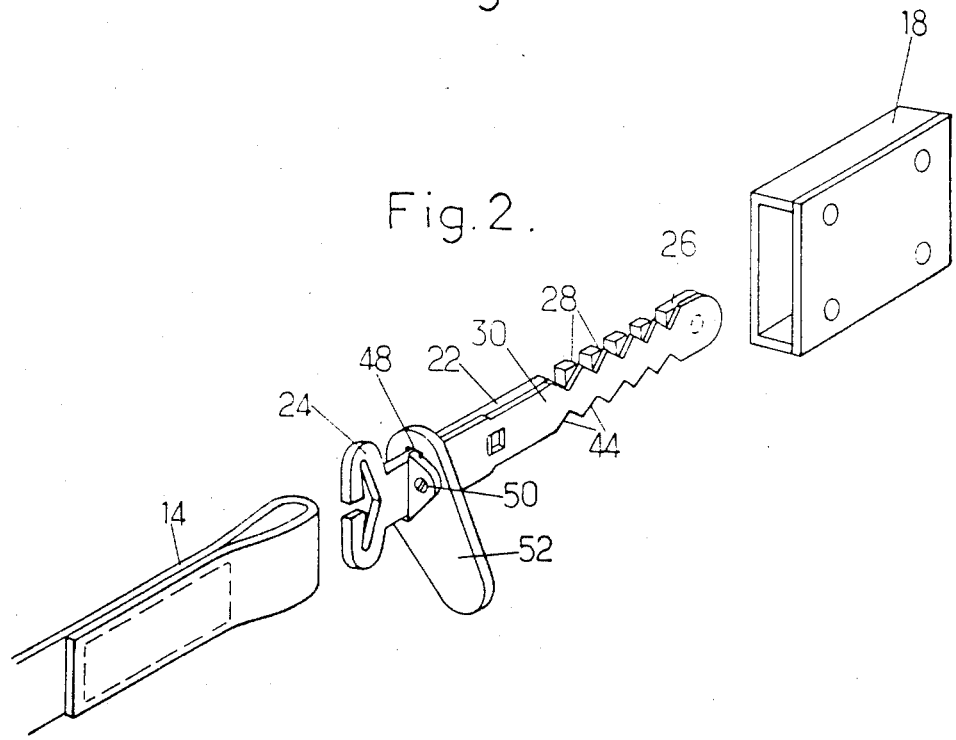
FIG. 2 is an exploded perspective view showing the main components of the device.

The way in which the moveable part is constructed is clearly illustrated in FIGS. 2 and 3, which show how the bayonet member 22 has one end terminating in a loop 24 for the attachment of the strap 14 and, at the opposite end from the loop, a portion forming a double rack and terminating in a rounded end 26 facilitating penetration. In the embodiment illustrated the rack has six notches 28. However, the number and spacing of the notches 28 will depend on the amplitude and adjustment pitch selected. However, for reasons of solidity of construction it will in practice be preferable not to go below a pitch of about 4 mm. Each notch has a front face perpendicular to the axis and adapted to act as a bearing for the locking fingers which will be described hereinafter, and an inclined rear face. The loop 24 is advantageously split to enable the strap to be readily interchanged and more particularly to enable a strap to be selected on the ground in relation to the anatomy of the wearer, the bayonet member allowing fine adjustment over a length utilized in the course of a flight.

A control plate 30 is mounted flat against the bayonet member 22 and can slide thereon. The control plate 30 bears a stub 32 which engages in an oval slot 34 in the rounded end 26 of the bayonet member 22, so as to limit the relative displacements of the control plate and the bayonet member. A return string 36, accommodated in a groove 38 in the bayonet member 22, is compressed between a stub 40 formed by a detent in the plate 30 and a bearing bead 42 received in the groove. A spring 36 therefore urges the plate into the position in which it is shown in FIG. 3. In this position the bottom points of the notches 44 with which the plate is formed and which have the same pitch as the notches 28 of the bayonet member coincide with the notches 28. The notches 44 have the same depth as the notches 28 but, unlike the latter they have an inclined front face 46, so that they can repel the locking fingers, which will be described hereinafter when the plate is pulled in relation to the bayonet member against the action of the spring 36. The length of the front face of the notches 46 corresponds to the clearance left by the overall hole 34, so that when the plate is pulled to the end it disengages the locking fingers from the notches 28 of the bayonet member.

A turned-down terminal edge 48 of the control plate 30 is fixed, via means which can be a simple screw 50, to a handle enabling the wearer of the device to unlock it and at the same time to withdraw the removable part from the receiver member 18. The handle is formed by a small plate formed with a hole through which the bayonet member 22 and the plate 30 can be passed. It also forms a guide cooperating with the stub 32 to keep the plate 30 and the bayonet member 22 in contact. Such guiding action of the handle 52 can be enhanced by the stub 32 by giving the stub 32 a shape such that it retains the bayonet member 22.

The receiver member 10, shown by way of example in FIG. 3 comprises a casing formed by an end 54 and a flat cover 56, between which two guides 58 forming struts are disposed. These members are kept assembled by any suitable means, such as screws 60. Each guide comprises an inclined front ramp 62 adapted to facilitate the insertion of the bayonet member, and a recess in which a locking finger 64 is trapped. A U-shaped spring 66, also trapped in the recess, tends to urge the finger 64 into the projecting position in which it is shown in FIG. 3. However, the recess is deep enough to enable the locking finger to be completely retracted, either under the thrust of the bayonet member when it is inserted, or under the front faces 46 of the notches 44 of the control plate when the latter is pulled in the direction of the withdrawal of the bayonet member (FIG. 4).

The operation of the device can be gathered immediately from its structure, so that it will be enough to sum it up.

To put the mask in place, it is enough for the wearer to insert the bayonet member 22 into the receiver members 10, for example, by pressing on the handles 52 (which can be disposed on either the right or left hand side). The fingers are retracted under the thrust of the notches of the bayonet member and the control plate and latch into the latter, immobilizing it. Once the mask is in place, the wearer can adjust it more tightly, simply by inserting a bayonet member 22 by an extra notch.

To remove or loosen the mask, it is sufficient for the wearer to pull on one of the handles 52. The control plate 30 first slides over the bayonet member 22, repelling the locking fingers, which move from the position shown in chain-dot lines in FIG. 4 into the position in solid lines. The stub 32 then abuts, connecting the plate 30 connecting it to the bayonet member 22, which it entrains during the continuation of its movement. In this relative position of the bayonet member 22 and the plate 30, the notches of the bayonet member no where extend beyond the notches of the plate. Withdrawal is performed as long as the wearer of the mask is pulling on the handle 52, but as soon as he releases the handle, relocking takes place, unless all the notches of the rack have passed beyond the resilient fingers.

The plate 30 can be much thinner (for example, three times thinner) than the bayonet member 22, since it transmits only the forces of unlocking and withdrawal. The bayonet member 22 can therefore be made very thick (for example, 3 mm), without however occupying an excessive amount of space. The bayonet member 22 and the plate 30, which further increases the rigidity of the bayonet member, since it is tied tightly thereagainst, will generally be made of stainless steel, while the handle 52 can be of moulded plastics.

To sum up: the result is a lightweight, robust device, easy to put in place and remove, which can be controlled by either the right or the left hand, merely by the easy displacement of a handle. Moreover, the device can be constructed in many various ways, more particularly with a view to adapting it to other applications than that given by way of example and it must be understood that the scope of the present patent covers all equivalent arrangements.

I claim:

1. A quick attachment device for the harness of a piece of equipment, comprising a receiving member adapted to receive a bayonet member rigidly connected to the harness, the bayonet member cooperating with the receiver member via locking means which can be retracted by pulling on a control plate borne by the bayonet member and can slide thereon from an abutment position into which it is resiliently urged, wherein said bayonet member is formed by a solid blade having a pair of longitudinal edges formed with respective racks engaging with retractable locking fingers borne by the receiver member, and the control plate comprises two sets each of a plurality of notches distributed along said plate with the same pitch as the racks and whose profile is such that they displace the fingers out of the racks when the control plate is pulled, in the direction corresponding to the withdrawal of the bayonet member, from an abutment position into which said control plate is resiliently urged.

2. A device according to claim 1, characterized in that the plate is retained flat on the bayonet member by a handle forming a guide and sliding means fixing the amplitude of movement permitted to the control plate.

3. A device according to claim 2, characterized in that the handle is detachable, so that either a handle actuable by the left or right hand can be mounted on the plate.

4. A device according to claim 1, characterized in that the bayonet is about three times thicker than the plate.

5. A device according to claim 1, characterized in that the notches of the control plate are so shaped that they allow the locking fingers to project as far as the end of the notches of the rack when the control plate is in said abutment position, and so that they completely cover the notches of the rack when the control plate is pulled.

6. A device according to claim 1, characterized in that the receiver member comprises two guides each having a front guide ramp for the bayonet member and a recess receiving a locking finger and its return spring.

7. A device according to claim 1, characterized in that the bayonet member has a strap-attaching loop which is split to enable a strap to be readily interchanged.

8. A quick attachment device for the harness of a piece of equipment, such as a respiratory mask, associated with a helmet, comprising a receiver member attached to the harness, adapted to engage in the receiver member in a pre-determined direction, cooperating with the receiver member via locking means which can be retracted by manual pulling, in the direction opposite from the direction of engagement, on a control plate borne by the bayonet member and which can slide thereon from an abutment position into which it is resiliently urged, wherein the bayonet member is formed by a solid blade provided with a rack engaging with retractable locking fingers borned by the receiver member and the control plate comprises a plurality of notches distributed along said plate with the same pitch as the rack and whose profile is such that they displace the fingers out of the rack when the control plate is pulled, in the direction corresponding to the withdrawal of the bayonet member, form an abutment position into which said control plate is resiliently urged.

9. A quick attachment device for the harness of a respiratory mask, associated with a helmet, comprising:
 (a) a receiver member provided with a pair of retractable locking fingers mounted for pivotal movement on said receiver member between an inward position into which they are biased by resilient means and a retracted spread apart position,
 (b) a bayonet member rigidly connected to the harness, adapted to engage into the receiver member in a predetermined direction, formed by a solid blade having a pair of opposed longitudinal edges formed with respective racks each for engagement with one of said locking fingers, said racks being formed for being retained by said fingers against removal when said fingers are in said inward position, and
 (c) a control plate slidably received on said blade, formed with two sets of notches distributed along said plate with the same pitch as the racks and whose profile is such that they spread apart said fingers out of engagement with the racks when said control plate is pulled, in the direction corresponding to withdrawal of the bayonet member, from an abutment position on the bayonet member into which it is resiliently urged, toward another abutment position on the bayonet member.

* * * * *